March 24, 1936.   L. S. BENSON   2,035,041
MULTIPLE BAKING PAN
Filed March 26, 1935   2 Sheets-Sheet 1

Inventor
L. S. Benson
By C A Snow & Co.
Attorneys.

March 24, 1936. L. S. BENSON 2,035,041
MULTIPLE BAKING PAN
Filed March 26, 1935 2 Sheets-Sheet 2
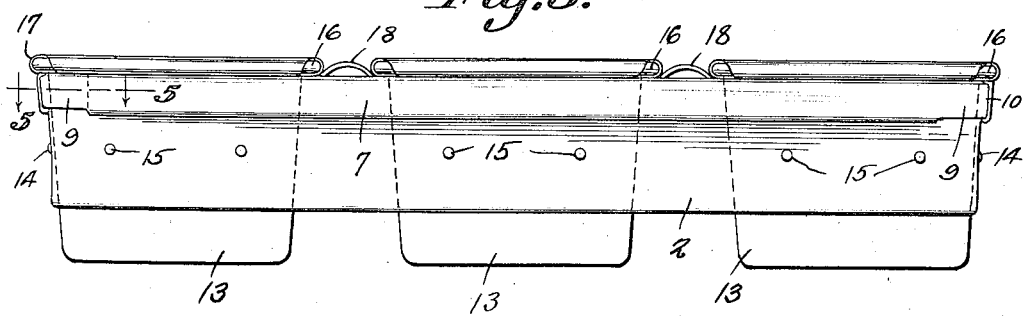
Fig. 3.
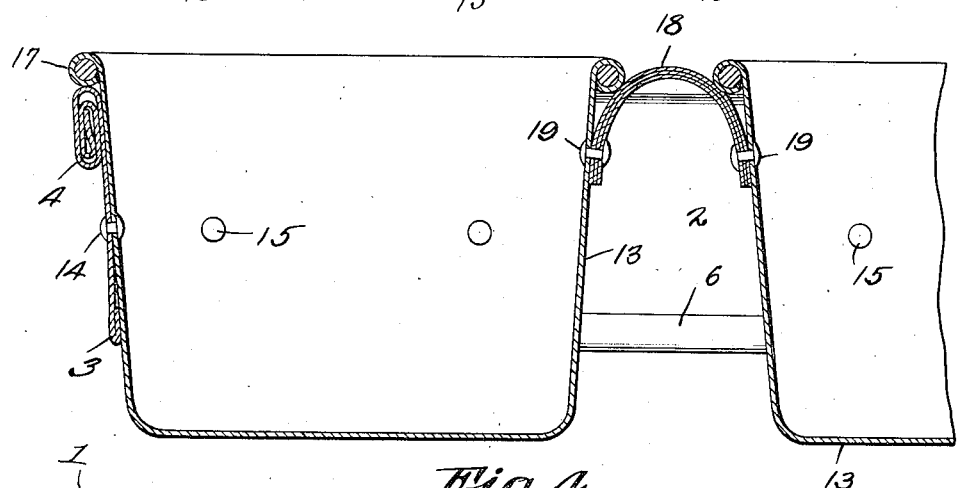
Fig. 4.
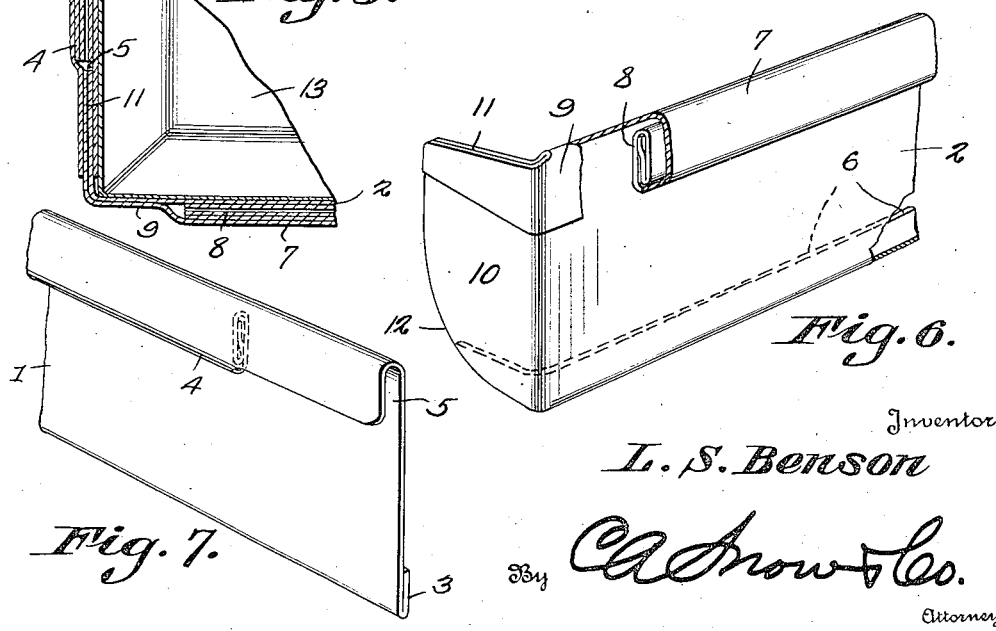
Fig. 5.
Fig. 6.
Fig. 7.
Inventor
L. S. Benson
By C. A. Snow & Co.
Attorneys.

Patented Mar. 24, 1936

2,035,041

UNITED STATES PATENT OFFICE 2,035,041

MULTIPLE BAKING PAN

Louis S. Benson, Wellston, Ohio

Application March 26, 1935, Serial No. 13,158

5 Claims. (Cl. 53—6)

This invention relates to baking pans of the multiple-pan type.

It is an object of the invention to provide a multiple baking pan wherein the pan units will be fully protected while being handled so as to prevent undesirable indentation without employing excessive weight in the construction of the device.

It is a further object of the invention to provide a novel form of protecting frame for the multiple pan whereby the same can be made light but strong and whereby the said frame can be assembled readily with the units of the pan.

A still further object is to provide new and novel means for connecting the pan units at their centers without interfering with expansion and contraction of the parts which frequently results in buckling or other distortion detrimental to the appearance of the baked loaves.

Another object is to provide multiple pans which can be stacked or nested and which, when thus superposed, will cause the weight to be distributed evenly from one multiple pan to the other, thereby avoiding bending or other distortion such as would occur should the weight be unevenly distributed.

A still further object is to provide a multiple pan the construction of which facilitates the insertion of the peal beneath the pan without the necessity of subjecting the pan to violent thrust to position it on the peal.

Another object is to form the frame of side and end straps or members the end portions of which are interfitted in a new and novel manner.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 3 is a side view thereof.

Figure 4 is an enlarged section on line 4—4 Figure 1.

Figure 5 is an enlarged section on line 5—5 Figure 3.

Figure 6 is a perspective view of one end portion of one of the side straps of the frame, a portion being broken away.

Figure 7 is a perspective view of one end portion of one of the end straps.

Figure 1:
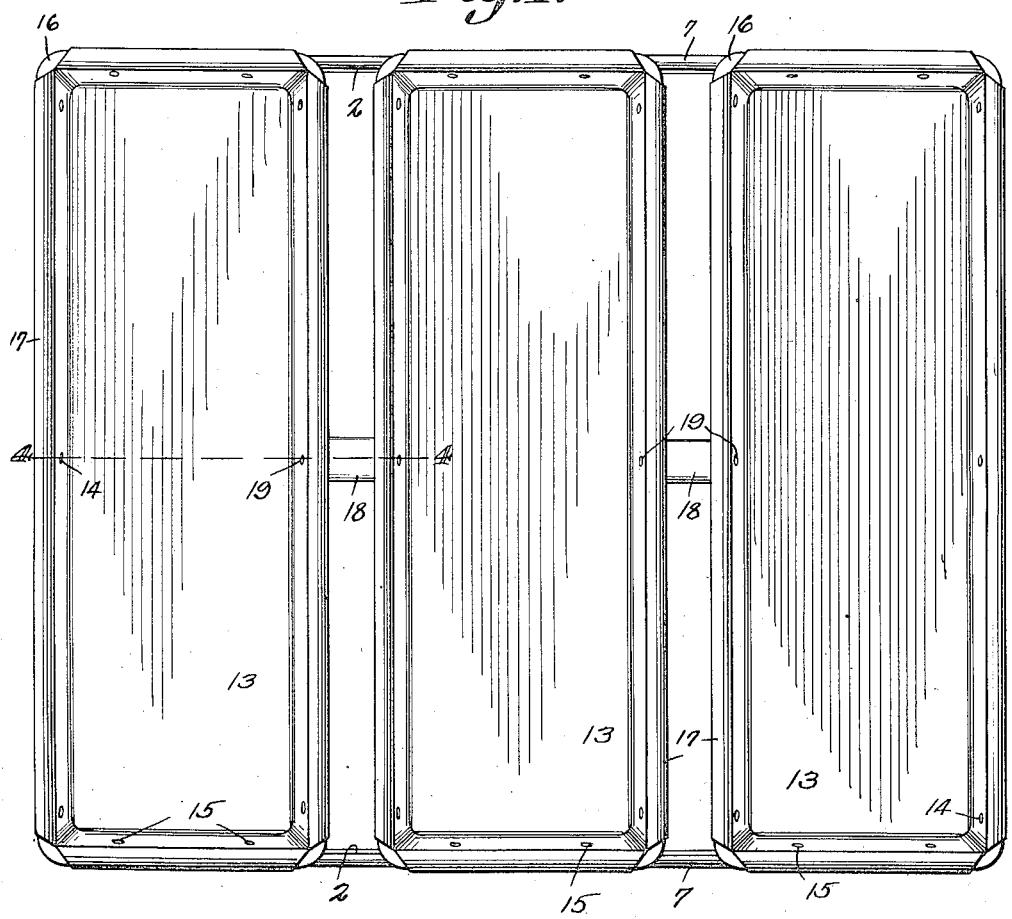
Figure 1 is a plan view of a multiple pan constructed in accordance with the present invention.
Figure 2:
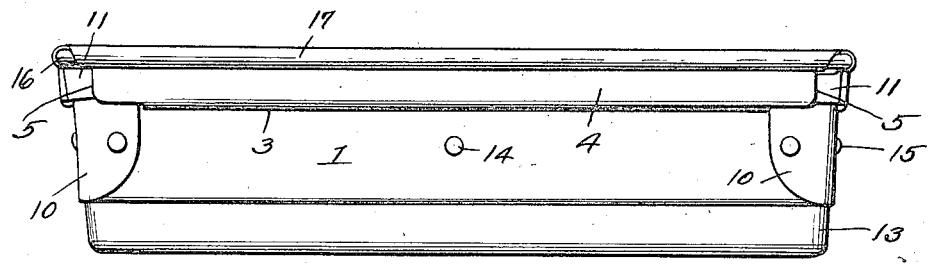
Figure 2 is an end elevation of the multiple pan.

In carrying out the invention there are provided two end straps indicated at 1 and two side straps indicated at 2. These straps are formed of sheet metal and each of the end straps 1 has its lower edge folded back upon itself as shown at 3 to provide a bottom marginal portion of double thickness. The upper edge portion of each end strap is bent to form a flattened roll or bead made up of several thicknesses and extending longitudinally of the strap as shown at 4, it being understood that the end portions of this rolled part of the strap 1 are cut away to leave inverted end channels 5.

Each of the side straps 2 is also reinforced along its bottom edge by folding its lower edge portion backwardly to provide a double thickness as indicated at 6, the arrangement being the same as that illustrated in Figure 7.

The top edge portion of each strap 2 is rolled to form a flattened bead 7 similar to the bead 4 and each end portion of this bead has its inner folds removed as shown at 8 so that each end of the strap will be lapped solely by a flange 9 constituting a continuation of the outer thickness of the roll forming bead 7. This flange is pressed tightly against the strap 2 as shown.

Each end of strap 2 is bent to provide a laterally extended wing 10 and the lapping portion of flange 9 is also bent therewith. The top edge of the wing as well as the flange 9 is cut away as shown at 11 and the lower edge of the wing 10 is preferably rounded as indicated at 12.

Two straps 2 are adapted to be arranged opposite each other and their wings 10 with the lapping portions of flanges 9 are then inserted into lapping engagement with the ends of opposed end straps 11 so that the inverted channels 5 will straddle the upper edges of the wings.

The frame formed by these assembled straps is extended about a series of pan units 13 formed of any suitable material, rivets 14 being employed for fastening the end straps 1 to the outer sides of the end pans of the series while additional rivets 15 are used for attaching the side straps 2 to the ends of the pan units 13. Some of the rivets 14 are extended through the wings 10 and serve to hold together the ends of the members of the frame.

Each of the pan units 13 can be reinforced at its top edges by rolling the metal of its walls outwardly over a stiff wire frame 16 as shown, the annular beads 17 thus provided being positioned where they will rest upon the top edges of the frame made up of straps 1 and 2.

Joining the pan units 13 at their centers are bowed connecting strips 18 each of which is formed of a piece of sheet metal bent to provide a plurality of folds, the said folds being flattened and the ends of the strip being secured to the outer surfaces of the adjacent pans by rivets 19 or the like.

It will be obvious that by forming a frame out of straps which are shown at 1 and 2, it is possible to use relatively thin metal and yet return desired strength without the usual attendant weight. This is due to the employment of the bottom reinforcements shown at 3 and 6.

As the bottom edges of the frame members are reinforced and are necessarily rounded due to the folds, it will be obvious that they offer minimum resistance to the insertion of a peal under the multiple pan when it is desired to remove the same from an oven. Should these edges be cut off so as to be left square and sharp, they would interfere with the easy insertion of a peal under the pan. By rounding the lower edges of the frame members, however, they will be deflected upwardly when the end of a peal is thrust thereagainst. Consequently the pans will be easily raised and it will not be necessary to exert force against them to lift or jump them out of position.

A further advantage in having a frame formed with rounded edges is found in the fact that sharp exterior crevices are avoided and consequently the resultant pan is more sanitary because there are no sharp crevices in which grease will accumulate and burn and from which it cannot be easily removed.

Obviously any desired number of pan units can be used in the structure, this depending upon the size of the frame. Under any conditions, however, the frame is strong and light and resists rough handling to a greater extent than do the usual frames employed in structures of this type. It might be stated that in the larger multiple pans the strength of the frame can be increased by increasing the number of folds.

The single fold provided at the bottom edges of the straps of the frame not only serves to reinforce the straps along these lower edges but they also serve to transmit weight from one bottom pan to another when a number of pans are stacked or nested, the weight being evenly distributed throughout the length and width of the pans.

The arched or curved connecting or bridge members 18 not only act to reinforce the walls of the pan units at their centers, but they also allow for contraction and expansion without distorting the pan walls and correspondingly marring the appearance of the baked products. As these connecting members are formed of folded metal strips they can be made quite narrow so as to offer minimum resistance to the flow of hot air between the pan units 13.

What is claimed is:

1. A multiple baking pan including a frame comprising opposed straps having end wings, opposed straps lapped by the wings and secured thereto, the upper portions of the straps being rolled and flattened to form reinforcing beads, portions of the beads of two of the straps being removed to provide inverted end channels into which the wings extend, pans surrounded by the frame and spaced apart to provide spaces therebetween opening upwardly, and means extending through the lapping portions of the wings and straps and the walls of the adjacent pans for holding them assembled.

2. In a multiple pan a frame comprising opposed straps having laterally extended wings at their ends, the upper portions of the straps being rolled and flattened to provide a reinforcing bead, portions of the bead being removed adjacent the ends thereof to provide tongues pressed against the wings, and opposed members lapping the wings and secured thereto, one edge portion of each of said last named members being rolled and flattened to provide a reinforcing bead of several thicknesses, portions of the ends of the bead being removed to provide inverted channel portions straddling the wings, pan units surrounded by said frame and extended therebelow, said units being spaced apart to provide spaces therebetween opening upwardly and said units having annular top portions bearing on the frame, and arcuate connecting means between and secured to the pan units.

3. In a multiple pan a frame comprising opposed straps having laterally extended wings at their ends, the upper portions of the straps being rolled and flattened to provide a reinforcing bead having several thicknesses, portions of the bead being removed adjacent the ends thereof to provide tongues pressed against the wings, and opposed members lapping the wings and secured thereto, one edge portion of each of said last named members being rolled and flattened to provide a reinforcing bead of several thicknesses, portions of the ends of the bead being removed to provide inverted channel portions straddling the wings, spaced pan units surrounded by said frame and extended therebelow, said units having annular top portions bearing on the frame, and arcuate connecting means interposed and secured to the pan units, each of said connecting means including a single piece of sheet metal bent to form a plurality of flattened folds.

4. In a multiple pan a frame comprising opposed straps having laterally extended wings at their ends, the upper portions of the straps being rolled and flattened to provide a reinforcing bead having several thicknesses, portions of the bead being removed adjacent the ends thereof to provide tongues pressed against the wings, and opposed members lapping the wings and secured thereto, one edge portion of each of said last named members being rolled and flattened to provide a reinforcing bead of several thicknesses, portions of the ends of the bead being removed to provide inverted channel portions straddling the wings, there being an upwardly folded portion extending longitudinally along the lower edge of each strap of the frame to provide lower edge portions of double thicknesses, and spaced pan units secured within and extending below the frame.

5. In a multiple pan a frame comprising opposed straps having laterally extended wings at their ends, the upper portions of the straps being rolled and flattened to provide a reinforcing bead having several thicknesses, portions of the bead being removed adjacent the ends thereof to provide tongues pressed against the wings, and opposed members lapping the wings and secured thereto, one edge portion of each of said last named members being rolled and flattened to provide a reinforcing bead of several thicknesses, portions of the ends of the bead being removed to provide inverted channel portions straddling the wings, there being an upwardly folded portion extending longitudinally along the lower edge of each strap of the frame to provide lower edge portions of double thicknesses, spaced pan units secured within and extending below the frame, there being outwardly extended annular portions at the tops of the pan units bearing upon the frame, and relatively narrow connecting members interposed between and secured to the pan units, each of said members comprising a single piece of metal bent to form a plurality of flattened folds and being bowed upwardly between the pans.

LOUIS S. BENSON.